United States Patent [19]

Young

[11] Patent Number: 5,399,909
[45] Date of Patent: * Mar. 21, 1995

[54] SECONDARY ELECTRICAL POWER SUPPLY

[75] Inventor: Thomas A. Young, Mount Olive, N.C.

[73] Assignee: Impulse NC, Inc., Mt. Olive, N.C.

[*] Notice: The portion of the term of this patent subsequent to Jan. 17, 2012 has been disclaimed.

[21] Appl. No.: 27,354

[22] Filed: Mar. 8, 1993

[51] Int. Cl.[6] .......................... H02J 7/00; H02J 9/00
[52] U.S. Cl. ........................................ 307/65; 307/9.1
[58] Field of Search ..................... 307/18, 19, 21, 22, 307/45, 46, 48, 49, 82, 69, 65, 71, 80

[56] References Cited

U.S. PATENT DOCUMENTS

| | | | |
|---|---|---|---|
| 4,339,704 | 7/1982 | McSparran et al. | 307/71 |
| 4,468,572 | 8/1984 | Miura et al. | 307/69 |
| 5,121,046 | 6/1992 | McCullough | 307/71 |

Primary Examiner—Jeffrey A. Gaffin
Assistant Examiner—Peter Ganjoo
Attorney, Agent, or Firm—Olive & Olive

[57] ABSTRACT

A secondary battery equipped power supply is provided with charging and related circuitry such that when placed in a location, such as in a DC powered electrical transit system, where there are normal, surge and continuous peak demands placed on the primary DC supply, the battery charges during normal operation and discharges to provide additional power on the occasion of a surge or peak demand.

8 Claims, 4 Drawing Sheets

SECONDARY ELECTRICAL POWER SUPPLY

BACKGROUND OF THE INVENTION

1. Field of the Invention

This invention relates to a secondary power supply useful individually or as part of a system of secondary direct current power supplies adapted to be powered by a primary DC power source having a typically fluctuating line voltage induced by a variable load and, more particularly, to a secondary power supply useful in a system of DC power supplies capable of handling normal demand, surge demand, and continuous peak demand power requirements imposed by such variable load.

2. Description of Prior Art

Direct current power systems which are subjected to variable loads can be seen, for example in various machinery, such as used in stamping and paper mills, various power tools and electrically powered transit systems. In such systems the variable load induces variations in the system's voltage and, generally, the point of highest load dictates the design of the system. Consequentially, the power supplies of such systems are typically designed to be able to provide power which is much higher than required for normal operation.

The auxiliary DC power supply of the invention has its most advantage when applied to a system having a DC power source which has a typically non-controlled DC section or link, a peak load that is high relative to the normal load, and that experiences a relatively high load-induced voltage drop in the DC link. Although it will be understood that the auxiliary power supply of the invention can be used in any such system where the above mentioned conditions are present, the advantages of the invention are clearly demonstrated when applied to an electrically powered transit system and, by way of example rather than by way of limitation, the auxiliary power supply of the invention will hereinafter be described as applied to an electrically powered transit system.

An electrical transit power supply system is generally comprised of several interconnected direct current power supplies which are dispersed throughout the service area. A network of either rails or overhead cables is energized by the dispersed power supplies and the rails or cables are used as feeding lines to transfer the power to electrically energized vehicles. A system for supplying power to the feeding lines must overcome several problems. First, due to the distances involved, consideration must be given to overcoming the large voltage drops and losses incurred due to the resistance of the feeding lines. Generally, the mid-distance point between the two farthest apart power supplies is the point of highest impedance. Therefore, the highest loss and voltage drop occur at this mid-point which effectively dictates the design of the entire system. Second, the system has to be responsive to three distinct power requirements of different characteristic, namely: normal demand, surge demand, and continuous peak demand.

Normal demand is the normal load created by a fixed number of vehicles during normal operation after start-up and on a substantially level grade. It is generally of a fairly constant amperage. Surge demand is created each time a vehicle starts its motion from rest and develops momentum. Such surge demand may generally last for several seconds or tens of seconds during which the system's voltage drops dramatically, especially at locations remote from the primary power supplies. A similar load and surge demand will be developed when a vehicle negotiates an up grade. Continuous peak demand is associated with transportation systems in which additional vehicles are added to the system during "rush hour." Such continuous peak demand may last up to several hours at a time. Since either of the above mentioned demands may occur at any point along the transit system where a vehicle is located, the power supply system must be able to deliver the required power at any point along the transit system. These factors dictate that the power sources themselves, both in size and power output, and the distribution conductors be as much as four times the size that would be required for meeting a normal demand exclusively.

In order to minimize the losses associated with the resistance of the cables or rails, separate direct current power supplies are usually spaced apart throughout the length of the system and at a distance typically no more than two miles apart. In addition, in order to minimize the losses and voltage drops which may occur in the conductors extending between the power supplies, some systems utilize large conductors in an overhead catenary configuration or a "third" power rail. In situations where the size of the primary feeding line is limited by aesthetic or other practical considerations, a "parallel feeding line" is employed.

The parallel feeding line is typically buried in the earth and is a large diameter line of much lower resistance than the primary feeding line. Consequently, a large amount of power may be transmitted by the parallel line without significant loss. This parallel line is connected to the primary line every block or so, thereby reducing the need for power being fed through the primary line. The installation of a parallel feeding line generally involves the largest amount of civil work, disruption, and the longest time element. It entails digging of a large trench for the entire length of the transit system along which the parallel feeding line is buried.

Another problem encountered with transit power supply systems designed according to the prior art is the power supplies interference with other users of the utility line. The surge demands and continuous peak demands significantly strain the capability of a utility power line. Such demands interfere with other users, which problem intensifies in a densely populated area where, in order to avoid power disturbances to residents, a dedicated utility line may be needed. Furthermore, because the transit power systems of the prior art satisfy the severe demand by drawing on the utility power, utility demand charges becomes a material part of the operational cost of the transit systems. Large, high capability generative devices are typically required in the prior art supply systems.

SUMMARY OF THE INVENTION

The secondary electrical power supply of the invention when applied in an electrical transit power supply system, being used by way of example, alleviates the need for either a parallel feeding line or a dedicated utility line, and provides a secondary power supply capable of handling normal, surge, and continuous peak demands. According to the invention as applied to an electrical transit system, primary direct current power supplies, capable of handling normal demand, are dispersed throughout the entire system at distances significantly greater than in the systems of the prior art. Secondary direct current power sources, comprising batteries and related circuitry arranged to provide a voltage which is equal or near that of the primary power supplies—any difference in voltage being dependent on the embodiment chosen—are dispersed between the primary power supplies, preferably at strategic locations where surge loads may occur and/or where the system's impedance is the highest. Such locations would be, for example, passenger stations, the beginning of an upward grade, locations coinciding with the mid-distance between any two spaced apart primary power supplies or the like, where a booster power supply might be required.

Since according to the invention the primary direct current power supplies are designed to handle only normal demand, their physical size and power output may be appreciably smaller than those of the primary power supplies used in the prior art. Moreover, the power requirement from the utility lines for powering the overall system incorporating the secondary power supplies of the invention is smaller and therefore the need for a dedicated utility line is eliminated and utility high demand charges are avoided.

Each secondary power supply according to the invention, utilizes a battery bank and a DC to DC converter having a controllable output voltage connected in a manner which allows operation at two modes, charge and discharge. During normal operation and non-operation (such as at night) of the transit system the converter operates in a charge mode, and allows power to be controllably diverted from the feeding lines into the secondary power supply via the converter. This allows charging of the batteries of the secondary power supply to selected voltages at selected times. During surge or continuous peak demand the secondary power supply operates in a discharge mode and allows current to flow from the secondary power source to the feeding lines, thereby providing additional power for the system without imposing a high power requirement on the converter. The switching between charge and discharge modes of the secondary power supply can be done by detection of the load on the feeding lines, this being the preferred method for handling surge demand, or by timed or manual switching, manual switching being the method preferred for handling continuous peak demand.

The advantages of the power supply system of the invention can be further demonstrated by referring to the following example which employs illustrative values. In a system having a battery bank terminal voltage of 600 volts, a DC to DC converter may be employed to draw power from the primary source at a 600 volt, 1 ampere level resulting in a 600 watt power drain. Neglecting efficiency losses, the converter can then be used to convert the 600 watts of power to 60 volts at 10 amperes which is connected in series with the 600 volt supply to charge the battery, thereby providing 6600 watts of charging power. The 6600 watts comprises 6000 watts (600 volts × 10 amperes) from the supply and 600 watts (60 volts × 10 amperes) contributed by the DC to DC converter. A battery bank forming part of the invention system and which is fully charged at 660 volts thus has a substantially large discharge capacity in response to a surge demand, thereby eliminating the need for a large primary power source and the need for relatively large distribution conductors.

Although some existing electrical transit power supply systems utilize a battery bank, the configurations employed by those systems do not reduce the losses incurred by the feeding lines. In a typical prior art system, the battery bank is located at the location of the primary power supply and the battery power is conducted through the entire length of the feeding lines, thereby incurring losses. In addition, such systems may be distinguished from an electrical transit power supply system utilizing the secondary power supply of this invention in that the battery bank of the prior art system is connected at the AC rather than at the DC side of the system. Moreover, these systems utilize the battery bank as a load shifting mechanism rather than as a booster system.

The present secondary power supply invention when applied to an electrical power supply system powered by a primary DC, source provides a secondary power supply or system of secondary power supplies capable of supplying adequate power to an electrical system for an efficient and uniform operation regardless of the power requirement of the system. An electrical transit power supply system represents an example of such an application.

It is therefore an advantage of the secondary power supply of the invention system that it provides a secondary DC power supply or arrangement of secondary DC power supplies for an electrical system capable of handling normal, surge, and continuous peak demands.

Another advantage of the secondary power supply of the invention is that it makes possible an arrangement of both primary and secondary DC power supplies for powering the electrical system which reduces the losses incurred in the lines used for transmitting power to electrically powered equipment associated with the system.

Yet another advantage of the secondary power supply of the invention is that it makes possible an arrangement of secondary and primary power supplies for an electrical system which eliminates the need for a dedicated utility power line to power the system.

A further advantage of the secondary power supply of the invention when applied to an electrical powered system is that it significantly reduces the utility high demand charges, thereby reducing the operational costs of the electrically powered system.

Another advantage of the secondary power supply of the invention is that when applied to a system having a fluctuating load, it provides for handling of high surge currents by a passive device, e.g. a diode or SCR, thereby reducing the need for large, high capability active devices.

Another advantage of the invention system is that it provides an inexpensive and efficient means for storing and releasing regenerative and braking energy.

Other objects and advantages will be more fully apparent from the following disclosure and appended claims.

DETAILED DESCRIPTION OF THE INVENTION

Figure 1:
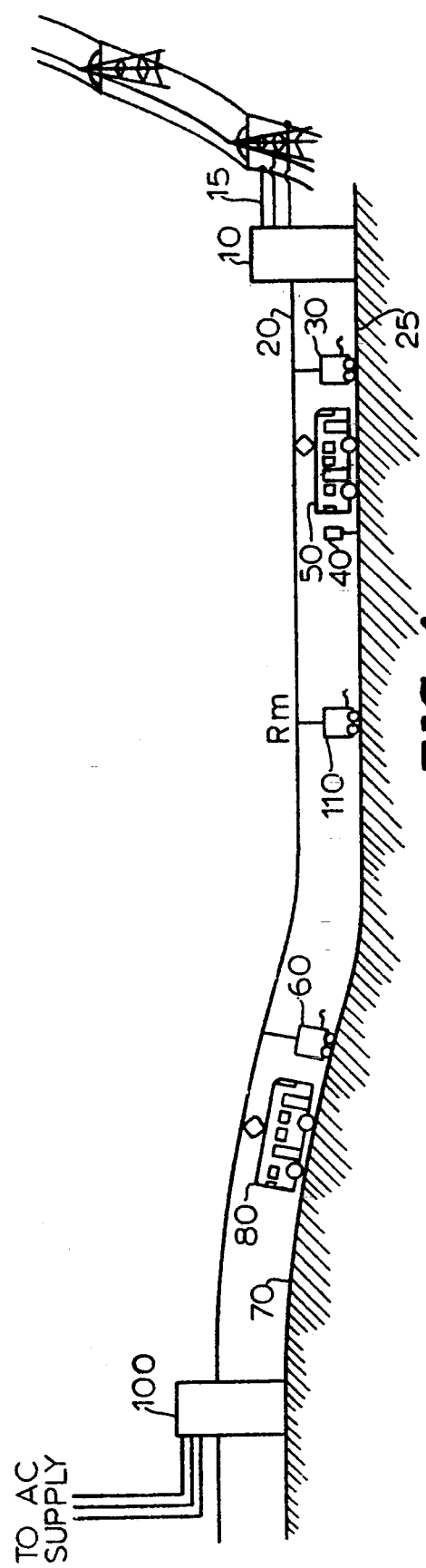
FIG. 1 illustrates a typical segment of an electrically powered transit system equipped with secondary power supplies constructed according to the invention.

Making reference initially to FIG. 1, there is shown a segment of a typical electrically powered transit system equipped with secondary power supplies constructed according to the invention. The illustrated primary power supplies 10 and 100 are capable of providing DC power sufficient for handling a normal load. Primary power supplies 10 and 100 are generally rectifiers which convert the alternating input current from the utility power line 15 into a direct current output fed to positive feeding line 20 and negative feeding line 25 which in the illustrated example constitute respectively an overhead line and a rail or pair of rails.

Secondary power supply 30, constructed and utilized as a booster power supply according to the invention, is shown located at passenger station 40. Secondary power supply 30 of the invention is connected to feeding lines 20 and 25 and provides the additional power necessary to handle surge demand. Such surge demand is created each time representative vehicle 50 starts to drive from rest. Another secondary power supply 60 constructed according to the invention is shown located at inclined slope 70. Secondary power supply 60 provides the additional power necessary to handle surge demand created each time representative vehicle 80 is driving up slope 70. An additional secondary power supply 110 constructed according to the invention is shown at a location marked Rm which is the mid-distance between primary power supplies 10 and 100, which location is the point of maximum impedance. During rush hour, when additional vehicles are added to the transportation system and continuous peak demand is created, secondary power supplies 30, 60 and 110, may be left connected in the discharge mode for the entire duration, until the additional vehicles are removed from the system. For ease of maintenance and replacement, secondary power supplies 30, 60 and 110, may be fitted with rail engaging wheels and a tow hitch as indicated in FIG. 1.

Although hereinafter the secondary power supply of the invention is described as located between two primary power supplies, other uses are envisioned. For example, in an existing electrically powered transit system where an additional link is to be added in order to lengthen the service route, such link can be constructed according to the system shown in FIG. 1. In such a case primary power supply 10 could become the last primary power supply of the existing system. The additional link may be built depending on demand with or without adding another primary power source such as primary power source 100, although the presence or absence of another primary power source will dictate the location of point Rm.

Figure 2:
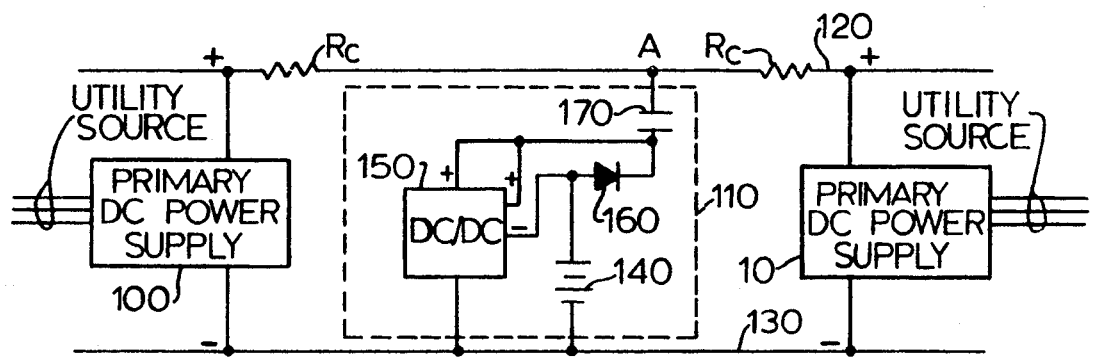
FIG. 2 illustrates a first preferred embodiment of the secondary power supply of the invention applied as a secondary direct current power source responsive to surge demand.

Reference is next made to FIG. 2 and the representative first embodiment of the secondary booster power supply 110 of FIG. 1. The illustrated transit system to which the secondary power supply of the invention is applied, is assumed to use power rectifiers as the primary power supplies, two of which, primary power supplies 100 and 10, are shown in FIG. 2. The power rectifiers as shown in FIG. 2, energize positive feeding line 120 and negative feeding line 130. The resistances associated with feeding lines 120 and 130 are marked as resistors Rc. Secondary power supply 110 in FIG. 2 includes a battery bank 140. The negative terminal of battery bank 140 is connected to negative feeding line 130, and the positive terminal of battery bank 140 is connected to positive feeding line 120 through a diode 160 followed by a breaker 170. The location where breaker 170 is connected to positive feeding line 120 is marked as point A, to indicate the location where, for the purposes of demonstrating the invention, the potential of positive feeding line 120 is measured. The positive terminal of battery bank 140 is also connected to the negative low voltage terminal of a DC to DC converter 150 having a controllable voltage ratio and forming part of the secondary power supply 110. Such converters referred to as switching power supplies are available and typically provide the voltage control function by varying the duty cycle. The low voltage positive terminal of converter 150 is connected to positive feeding line 120 through breaker 170. The positive high voltage terminal of converter 150 is connected to feeding line 120 through breaker 170 and negative high voltage terminal of converter 150 is connected to feeding line 130. As shown in FIG. 2 and in each of the later described secondary power supply embodiments, a converter 150 is provided at the same physical location as that of a battery bank 140 for each secondary power supply.

Battery bank 140 is designed to provide a terminal voltage which is lower than the no-load DC voltage of the supply system, but higher than the nominal DC voltage of the system under load as measured at the location of the battery bank. Typical values are 650 volts no-load system voltage, 600 volts nominal system voltage, and 620 volts battery terminal voltage. During low load, converter 150 acts as a controller and regulates the charging of battery bank 140 by providing a controllable voltage drop between feeding line 120 and battery bank 140 and conserving energy by converting voltage and producing current flow into the feeding line. During surge demand, the system's voltage drops below the battery bank 140 voltage and diode 160 allows current to flow directly from battery bank 140 to the transit system and bypasses converter 150. Battery bank 140, converter 150, and diode 160 are electrically protected by breaker 170.

Figure 3:
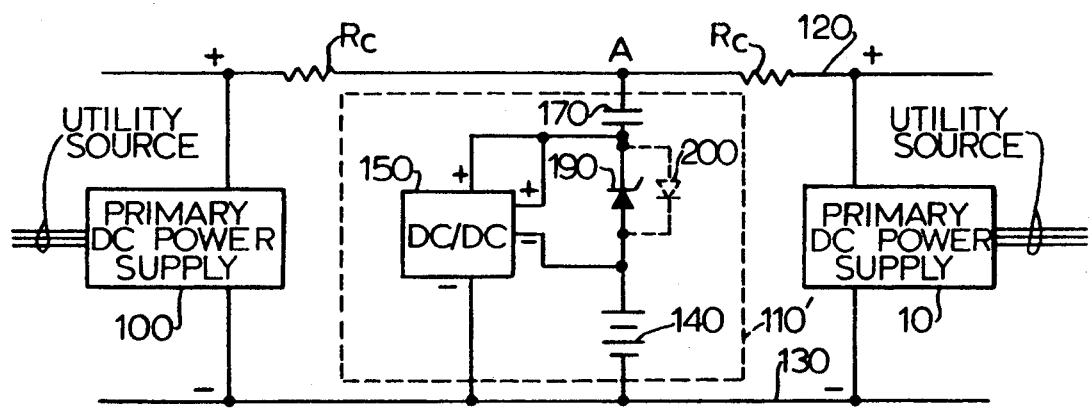
FIG. 3 illustrates a second embodiment of the secondary power supply of the invention in use for the storage of regenerative energy as, for example, braking energy in a transit system.

Reference is next made to FIG. 3 and a second embodiment secondary power booster supply illustrated in dashed lines 110' and incorporating an SCR or thyristor 190 and diode 200 connected as shown. In this embodiment, battery bank 140 has a slightly higher terminal voltage than the no-load system voltage. A typical value of the battery bank terminal voltage for battery bank 140 for a no-load system voltage of 650 volts would be 670 volts. During low load, converter 150 boosts the system's voltage for the purpose of charging battery bank 140 by converting the high voltage at its input terminals to a low voltage which is added to the system voltage. SCR 190 may be triggered to allow flow of current from battery bank 140 to the system by the voltage of the system, or may be turned on by a trigger circuit or by a timer for the purpose of providing continuous flow of current from battery bank 140 during continuous peak demand. Diode 200 is used to control the passage of regenerative current for storage of excess power in battery bank 140. SCR 190 can be comutated by converter 150 or by opening of breaker 170.

Figure 4:
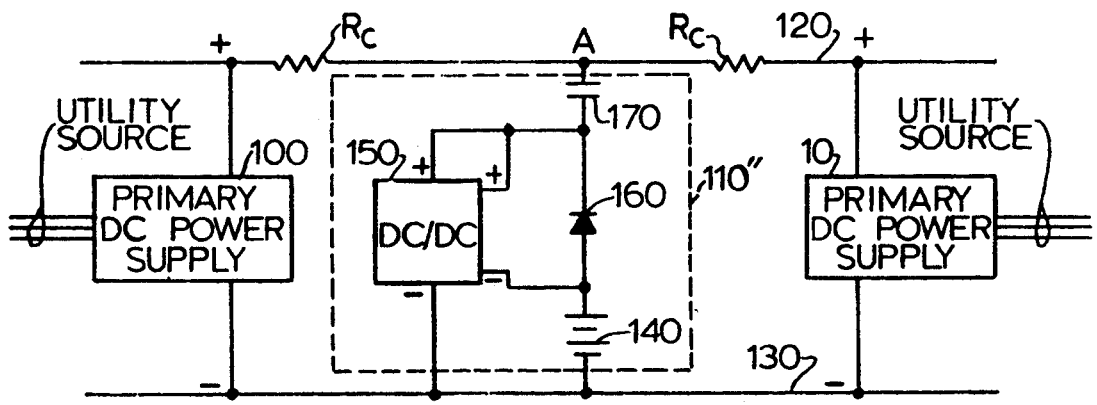
FIG. 4 illustrates a third embodiment of the secondary power supply of the invention applied so as to be responsive to surge and continuous peak demands.

A third embodiment of secondary power supply according to the invention is shown in FIG. 4 and is identified by dashed lines 110''. Generally it utilizes power rectifiers and batteries in the same configuration as in the first embodiment; however, the DC/DC converter 150 of FIG. 4 is assumed to be constructed so as to be capable of bi-directional current flow. As an example, this could be accomplished by two "back-to-back" units or by synchronous switching of high voltage and low voltage devices. During continuous peak demand, the secondary voltage of the DC/DC converter 150 is increased to induce battery current to flow into the traction system. When surges occur, the DC/DC converter 150 secondary voltage collapses (current limits) and the surge is carried through diode 160.

With continuing and more specific reference to FIG. 4, in order to allow battery bank 140 to operate more effectively during continuous peak demand periods, converter 150 includes means to enable bi-directional current flow. During normal operation, converter 150 is capable of charging battery bank 140, for which operation the negative output terminal of converter 150 is connected to the positive terminal of battery bank 140. During such a condition, the voltage ratio of converter 150 is set so that when the low voltage terminal voltage is added to the voltage of battery bank 140, the resulting total voltage is lower than the potential of positive feeding line 120 as measured at point A; thus allowing current flow from the distribution line to battery bank 140 and providing a current flow into the feeding line from the high voltage terminals. During continuous peak demand, the output voltage of converter 150 is increased, so that the added voltages of battery bank 140 and the output of converter 150 is higher than the potential of positive feeding line 120 as measured at point A, thereby inducing current flow into the distribution line. This is the condition demonstrated in FIG. 4. During surge demand, when the line voltage drops below battery bank 140 voltage, the output voltage of converter 150 collapses (current limits) and surge current flows from battery bank 140 through diode 160.

Figure 5:
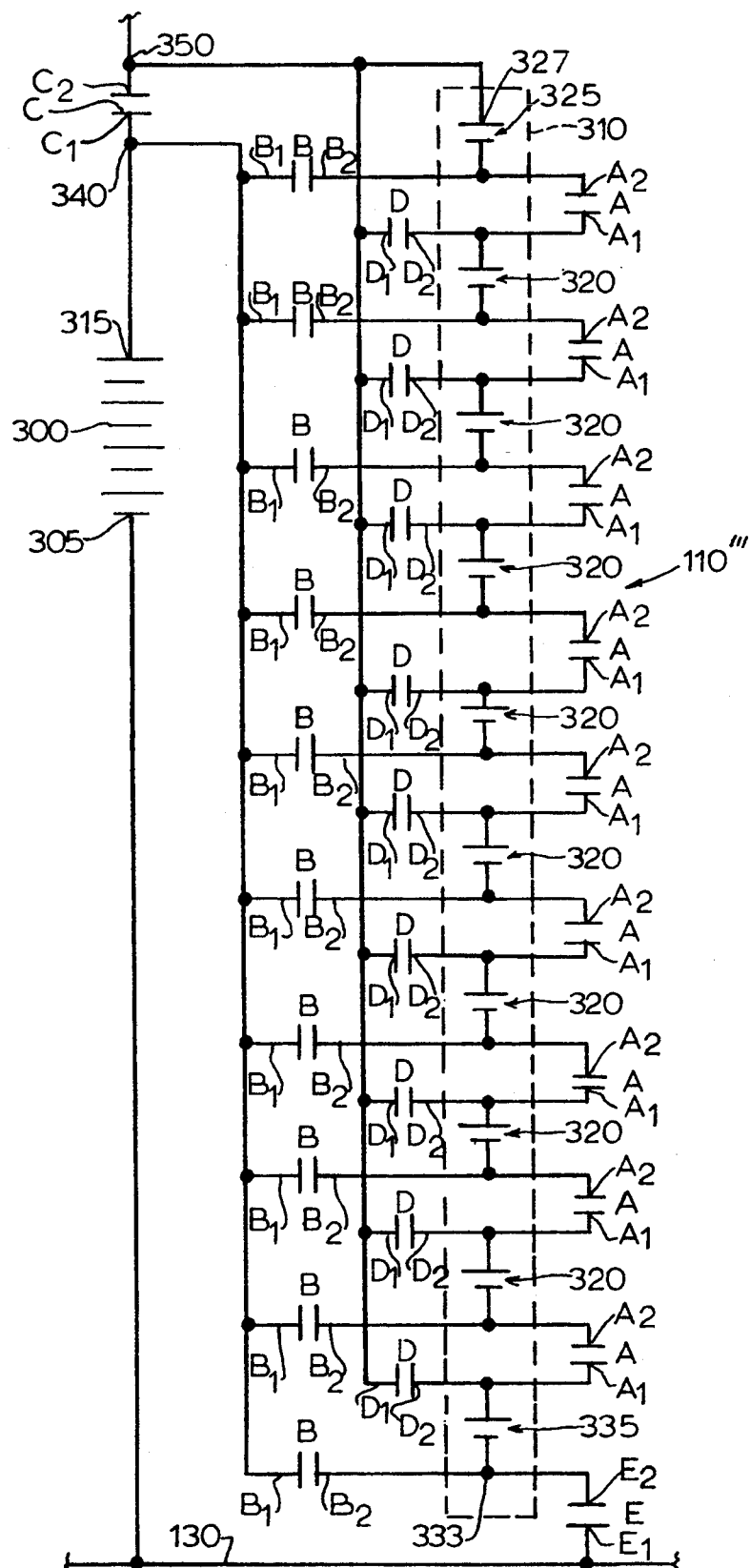
FIG. 5 illustrates in some detail a fourth embodiment of the secondary power supply of the invention applied so as to be responsive to surge and continuous peak demands.
Figure 6:
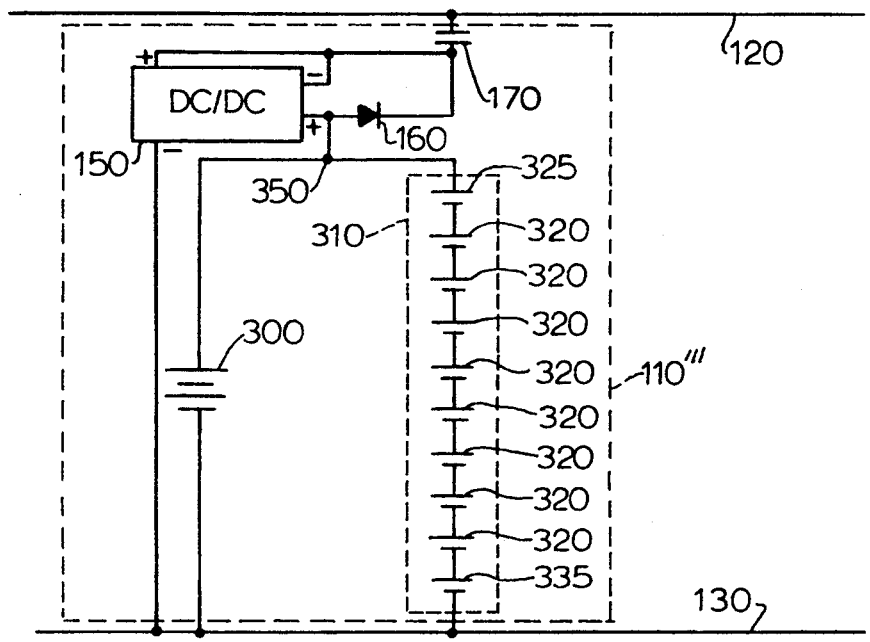
FIG. 6 illustrates more substantially the fourth embodiment of the secondary power supply of the invention in a normal operation mode.
Figure 7:
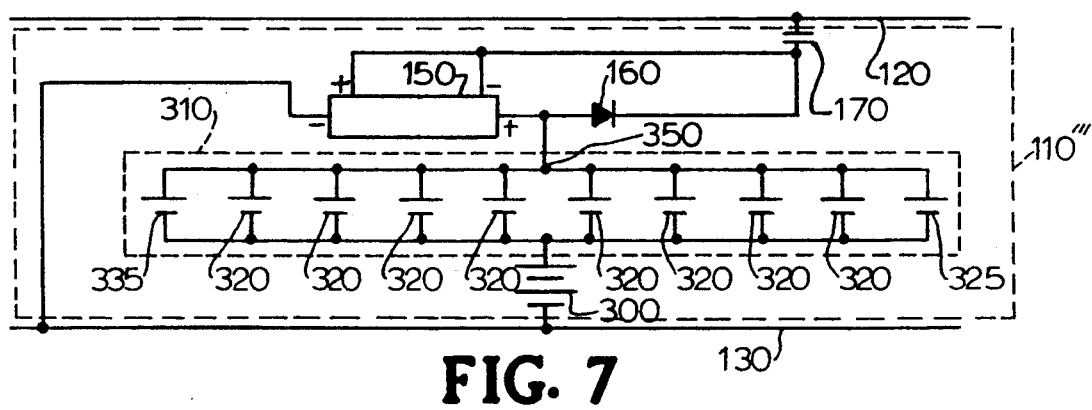
FIG. 7 illustrates substantially the fourth embodiment of the secondary power supply of the invention in a continuous peak demand mode.

A portion of a fourth secondary power supply embodiment 110''' is shown in FIG. 5 and is further illustrated in two modes in FIGS. 6 and 7. This embodiment replaces battery bank 140 of the first embodiment with main battery bank 300, supplying 600 volts, and secondary battery bank 310. Secondary battery bank 310 is comprised of battery 325, battery 335, and eight batteries 320, each supplying 60 volts, and with circuity which can be alternately arranged to collectively provide either 60 volts or 600 volts. Also shown in FIG. 5 are switches marked as "A," "B," "C," "D" and "E." The various positions of the combinations of the switches can be accomplished by utilizing a multi-contact drum switch.

With further reference to FIG. 5, negative terminal 305 of main battery bank 300 is connected to negative feeding line 130, while positive terminal 315 of main battery bank 300 is connected through junction 350 to terminal C1 of switch C. Terminal C2 of switch C is connected through junction 350 to diode 160 and converter 150 (as shown in FIGS. 6 and 7). Terminal B1 of each switch B is connected to terminal C1 of switch C, while terminal B2 of each switch B is connected to a negative terminal of one of the batteries which comprises secondary battery bank 310. Terminal E1 of switch E is connected to negative feeding line 130, and terminal E2 of switch E is connected to negative terminal 333 of battery 335. Positive terminal 327 of battery 325 is connected to terminal C2 of switch C. Battery 325, battery 335, and all batteries 320 are interconnected by switches A. Each terminal A1 of each switch A is connected to a positive terminal of one battery while terminal A2 of the same switch A is connected to the negative terminal of a successive battery so that when all switches are in closed position, battery 325, battery 335 and all batteries 320 are connected in series.

During a period of normal demand, switch C, switch E, and all switches A are closed, while all switches B and D are open. The resulting electrical circuit is schematically shown in FIG. 6, which depicts the FIG. 5 arrangement as substituting for battery bank 140 of the first embodiment shown in FIG. 2. In FIG. 6, secondary battery bank 310 is connected in parallel with main battery bank 300, and the resulting arrangement is connected to converter 150 and diode 160 in the same manner as battery bank 140 of the first embodiment depicted in FIG. 2. The combined voltage of all the batteries which comprise secondary battery bank 310 equals the voltage of main battery bank 300.

During a period of continuous peak demand switches A, C, and E are open, while switches B and D are closed. The resulting electrical circuit is shown in FIG. 7, which schematically depicts this latter arrangement as a substitute for battery bank 140 of the first embodiment shown in FIG. 2. In FIG. 7 batteries 320, 325, and 335 are all interconnected in parallel so that secondary battery bank 310 supplies a voltage which equals the voltage of main battery bank 300 divided by ten. Secondary battery bank 310 is then connected in series with main battery bank 300 so that the resulting total voltage is the sum of the voltage of main battery bank 300 and the voltage of secondary battery bank 310.

In all embodiments, during energizing, the battery charging current is the same as the secondary current of the DC/DC converter 150. However, the charging voltage is made up of the line voltage added to the charging voltage of the DC/DC converter 150. In all embodiments, during discharge under a surge condition, for example, the supply system impedance is used in combination with the diode or SCR to supply a relatively high current not limited by the capability of the DC/DC converter 150.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A power supply system, comprising:
   (a) a primary DC power supply powered by a utility power source;

(b) an auxiliary power supply alternatingly operable in a charge or discharge mode and connected to and energized solely by said primary DC power supply, said auxiliary power supply comprising:

(i) a controllable DC to DC converter having high voltage and low voltage terminals, said high voltage terminals being connected to the primary DC power supply and said low voltage terminals establishing a DC voltage level which is substantially less than the voltage level of the primary DC power supply;

(ii) rechargeable battery means having a terminal voltage whose level equals, is greater or is lower than the voltage level of the primary DC power supply in some predetermined amount, said battery means having a first terminal connected to a first side of said primary DC power supply;

(iii) circuit means connecting the low voltage terminals of said converter between a second terminal of said battery means and a second side of said primary DC power supply; and (iv) said converter being operative for controlling the voltage of said low voltage terminals in correspondence with the load imposed on the primary DC power supply and the terminal voltage of said battery means, thereby controlling the charge and discharge of the battery means; and (c) whereby, energy is transferred from said primary DC power supply to said auxiliary power supply battery means when said auxiliary power supply is in a charge mode, and energy is transferred from said battery means and added to the energy provided by said primary DC power supply when said auxiliary power supply to said load is in a discharge mode.

2. An auxiliary power supply as claimed in claim 1, including:

(a) load control means connected to both said primary DC supply and said battery means and operative to directly connect the battery means to the primary DC supply under a load condition in which the load demand imposed on the DC power supply exceeds the current capability of said converter, thereby allowing the battery means to rapidly discharge and supply a relatively high level of current to said primary DC supply during existence of said condition.

3. An auxiliary power supply as claimed in claim 2 wherein said load control means comprises a diode.

4. An auxiliary power supply as claimed in claim 2 wherein said load control means comprises an SCR.

5. An auxiliary power supply as claimed in claim 1 wherein said converter is adapted to have the voltage of said low voltage terminals regulated in a manner allowing reversal of the associated current polarity.

6. An auxiliary power supply as claimed in claim 1 wherein said primary DC power supply comprises a DC power supply for powering a traction load and said selected condition comprises a normal, surge or peak demand condition related to said traction load.

7. An auxiliary power supply as claimed in claim 6 wherein said battery means comprises a main battery and a plurality of individual batteries at least some of which are selectively connectable in either a series or parallel arrangement with each other and with said main battery enabling the nominal voltage of said battery means to be changed thereby enabling said battery means to provide a low terminal voltage during charging condition and a higher terminal voltage when required to provide a discharge during peak loads imposed on said primary supply.

8. An auxiliary power supply as claimed in claim 1 wherein said battery means comprises a plurality of individual batteries at least some of which selectively connectable in either a series or parallel arrangement with each other enabling the nominal voltage of said battery means to be changed, thereby enabling said battery means to provide a low terminal voltage during charging condition and a higher terminal voltage when required to provide a discharge during peak loads imposed on said primary supply.

* * * * *